US012772151B2

(12) United States Patent
Gao et al.

(10) Patent No.: US 12,772,151 B2
(45) Date of Patent: Oct. 20, 2026

(54) CELL CONFIGURATION SCHEMES IN WIRELESS COMMUNICATIONS

(71) Applicant: ZTE Corporation, Shenzhen (CN)

(72) Inventors: Yuan Gao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 894 days.

(21) Appl. No.: 18/164,104

(22) Filed: Feb. 3, 2023

(65) Prior Publication Data

US 2023/0262588 A1 Aug. 17, 2023

Related U.S. Application Data

(63) Continuation of application No. PCT/CN2020/106525, filed on Aug. 3, 2020.

(51) Int. Cl.

*H04W 48/16* (2009.01)
*H04W 36/00* (2009.01)
*H04W 48/08* (2009.01)
*H04W 48/18* (2009.01)
*H04W 48/20* (2009.01)

(52) U.S. Cl.

CPC ....... *H04W 48/16* (2013.01); *H04W 36/0077* (2013.01); *H04W 48/08* (2013.01); *H04W 48/18* (2013.01); *H04W 48/20* (2013.01)

(58) Field of Classification Search

CPC . H04W 48/16; H04W 36/0077; H04W 48/08; H04W 48/18; H04W 48/20; H04W 48/12; Y02D 30/70

See application file for complete search history.

(56) References Cited

U.S. PATENT DOCUMENTS

| | | | |
|---|---|---|---|
| 2018/0270744 A1 | 9/2018 | Griot et al. | |
| 2019/0174554 A1 | 6/2019 | Deenoo et al. | |
| 2020/0022095 A1 | 1/2020 | Kim et al. | |
| 2020/0120589 A1* | 4/2020 | Velev | H04W 76/25 |
| 2021/0105308 A1* | 4/2021 | Bouazizi | H04L 65/1016 |

(Continued)

FOREIGN PATENT DOCUMENTS

| | | |
|---|---|---|
| CN | 107223350 A | 9/2017 |
| CN | 109246775 | 1/2019 |

(Continued)

OTHER PUBLICATIONS

Second Office Action for co-pending CN Patent Application No. 202080105825.3, mailed on Apr. 7, 2025 (16 pages with machine translation).

(Continued)

*Primary Examiner* — Ashley Shivers

(74) *Attorney, Agent, or Firm* — Ashurst Perkins; Coie US LLP

(57) ABSTRACT

A wireless communication method is described to comprise receiving, by a user device, from a network device, one or more sets of configuration information for a cell selection or a cell reselection and association information indicating one or more network slices or network slice groups associated with the one or more sets of the configuration information; and performing, by the user device, the cell selection or the cell reselection based on a final configuration information that is one of the one or more sets of the configuration information.

17 Claims, 9 Drawing Sheets

(56) References Cited

U.S. PATENT DOCUMENTS

| | | | | |
|---|---|---|---|---|
| 2022/0377545 A1* | 11/2022 | Wang | H04L 65/1016 | |
| 2023/0156583 A1* | 5/2023 | Murray | H04W 48/20 | 370/329 |

FOREIGN PATENT DOCUMENTS

| | | |
|---|---|---|
| CN | 109743213 | 5/2019 |
| CN | 110226337 A | 9/2019 |
| CN | 111148187 | 5/2020 |
| CN | 111149387 | 5/2020 |
| CN | 111386727 A | 7/2020 |
| WO | 2018128020 A1 | 7/2018 |

OTHER PUBLICATIONS

Office Action for co-pending KR Patent Application No. 10-2023-7004164, mailed on Oct. 31, 2025 (12 pages with Google translation).

International Search Report and Written Opinion for International Application No. PCT/CN2020/106525, mailed on Mar. 31, 2021 (9 pages).

First Examination Report for Indian Patent Application No. 202317006580, mailed on Mar. 5, 2024 (7 pages).

European Extended Search Report for EP Patent Application No. 20 948 376.7, mailed on Jan. 3, 2024 (9 pages).

EPO, Intention to Grant for EP Patent Application No. 20 948 376.7, mailed on Apr. 14, 2025, 7 pages.

CNIPA, Notification to Complete Formalities of Registration for Chinese Application No. 2020801058253, 10 pages with unofficial English translation.

First Office Action for co-pending CN Patent Application No. 202080105825.3, mailed on Oct. 17, 2024 (18 pages with machine translation).

* cited by examiner

CELL CONFIGURATION SCHEMES IN WIRELESS COMMUNICATIONS

CROSS-REFERENCE TO RELATED APPLICATION

This application is a continuation and claims priority to International Application No. PCT/CN2020/106525, filed on Aug. 3, 2020, the disclosure of which is hereby incorporated by reference herein in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for control information configuration in wireless communications.

In one aspect, a wireless communication method is disclosed. The wireless communication method is provided to include receiving, by a user device, from a network, one or more sets of configuration information for a cell selection or a cell reselection and association information indicating one or more network slices or network slice groups associated with the one or more sets of the configuration information; and performing, by the user device, the cell selection or the cell reselection based on a final configuration information that is one of the one or more sets of the configuration information.

In another aspect, a wireless communication method is disclosed. The wireless communication method includes transmitting, by a network device, to a user device, one or more sets of configuration information for a cell selection or a cell reselection and association information indicating one or more network slices or network slice groups associated with the one or more sets of the configuration information.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

These, and other features, are described in the present document.

DETAILED DESCRIPTION

The disclosed technology provides implementations and examples of cell configuration schemes in wireless communications. While 5G terminology is used in some cases to facilitate understanding of the disclosed techniques, which may be applied to wireless systems and devices that use communication protocols other than 5G or 3GPP protocols.

Network Slicing has been introduced in New Radio (NR), which is a concept to allow differentiated treatment depending on requirements for each customer. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions.

Each network slice is uniquely identified by a single-network slice selection assistance information (S-NSSAI). The network slice selection assistance information (NSSAI) includes one or a list of S-NSSAIs (Single NSSAI) where a S-NSSAI is a combination of followings:

- mandatory SST (Slice/Service Type) field, which identifies the slice type and consists of 8 bits (with range is 0-255);
- optional SD (Slice Differentiator) field, which differentiates among Slices with same SST field and consist of 24 bits.

The standardized SST values are shown in the table below.

TABLE 1

| Standardized SST values | | |
|---|---|---|
| Slice/ Service type | SST value | Characteristics |
| eMBB | 1 | Slice suitable for the handling of 5G enhanced Mobile Broadband. |
| URLLC | 2 | Slice suitable for the handling of ultra- reliable low latency communications. |
| MIoT | 3 | Slice suitable for the handling of massive IoT. |
| V2X | 4 | Slice suitable for the handling of V2X services. |

Figure 1:
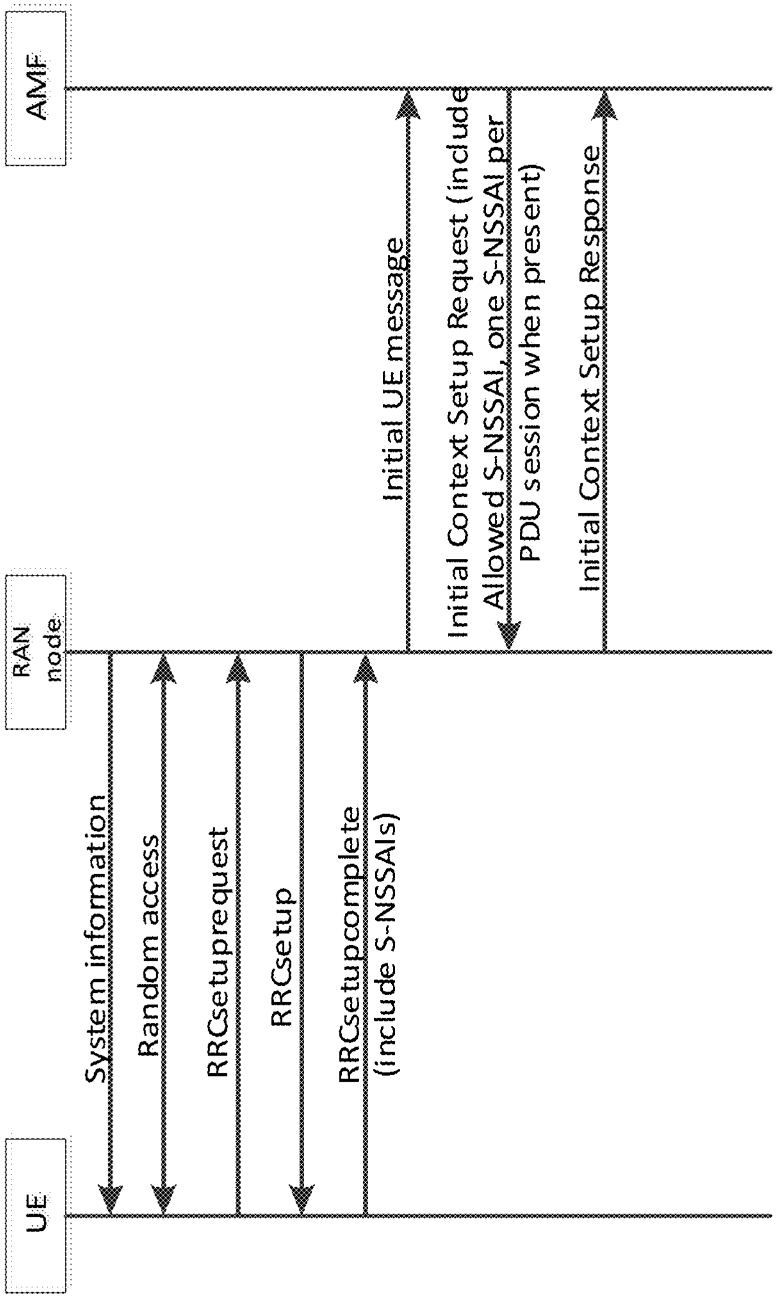
FIG. 1 shows a conventional cell configuration process.

FIG. 1 shows a conventional cell configuration process. As shown in FIG. 1, no slice specific information is provided in system information. The user equipment (UE) perform cell selection and reselection without considering the slice information. After UE selects a cell, the UE initiate random access and sets up the RRC connection. The UE will provide the S-NSSAIs to the RAN node to help the RAN node to select an appropriate AMF. Following the initial access that allows the establishment of the RRC connection and the selection of the correct AMF, the AMF establishes the complete UE context by sending the Initial Context Setup Request message to the NG-RAN over NG-C. The message contains the allowed NSSAI and additionally contains the S-NSSAI(s) as part of the PDU session(s) resource description when present in the message. Upon successful establishment of the UE context and allocation of PDU session resources to the relevant network slice(s), the NG-RAN responds with the Initial Context Setup Response message. One S-NSSAI is added per PDU session to be established, so NG-RAN is enabled to apply policies at PDU session level according to the SLA represented by the network slice, while still being able to apply (for example) differentiated QoS within the slice.

The cell selection/reselection priority is configured per cell or per UE in the Uu interface and UE is not aware of the supported slice of the candidate reselection target cells. Thus, the UE perform cell selection and reselection without taking the slice information into consideration. As a result, the UE may select and initiate random access to a cell which belongs to an inappropriate slice which is not preferred by network (NW) for the UE and may get rejected several times before finding the most appropriate cell. In recognition of this issues, various implementations of the disclosed technology are provided to assist the UE to select a cell supporting the intended slice during the cell reselection procedure.

Figure 2:
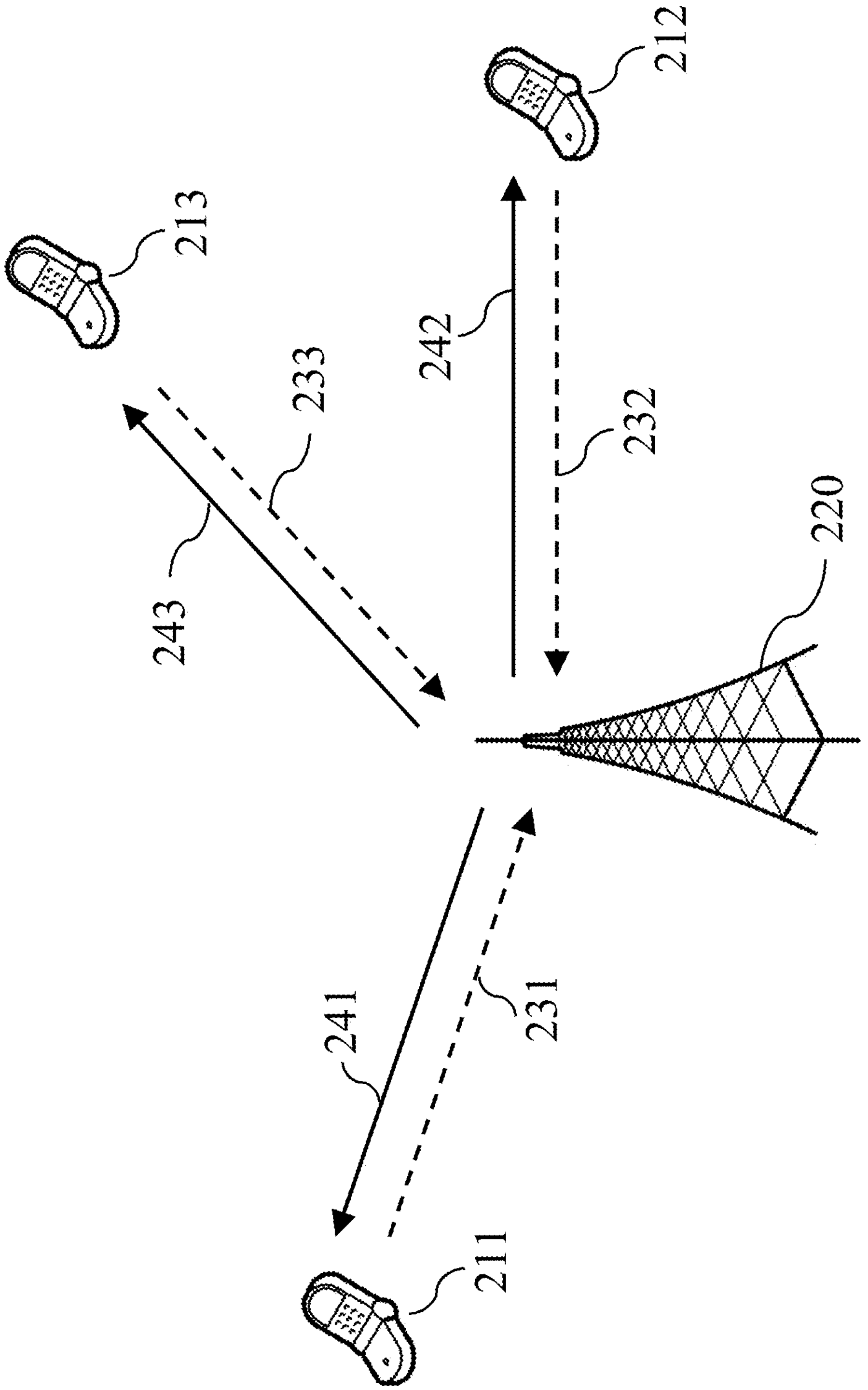
FIG. 2 shows an example of wireless communication including a base station (BS) and user equipment (UE) based on some implementations of the disclosed technology.

The various implementations of the disclosed technology are provided in a wireless communication system. FIG. 2 shows an example of a wireless communication system (e.g., a 5G or NR cellular network) that includes a BS 220 and one or more user equipment (UE) 211, 212 and 113. In some embodiments, the UEs access the BS (e.g., the network) using implementations of the disclosed technology (231, 232, 233), which then enables subsequent communication (241, 242, 243) from the BS to the UEs. The UE may be, for example, a smartphone, a tablet, a mobile computer, a machine to machine (M2M) device, an Internet of Things (IoT) device, and so on.

Figure 3:
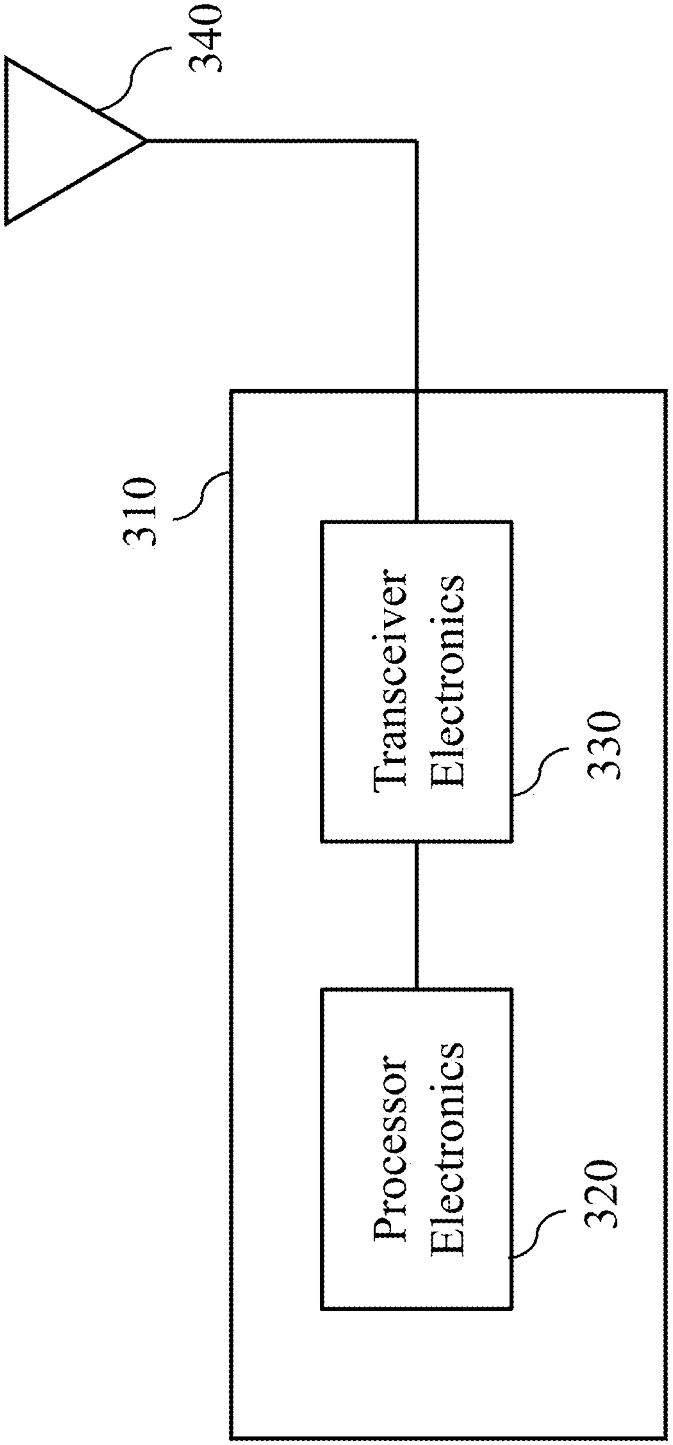
FIG. 3 shows an example of a block diagram of a portion of an apparatus based on some implementations of the disclosed technology.

FIG. 3 shows an example of a block diagram representation of a portion of an apparatus. An apparatus 310 such as a base station or a network device, a user device or a wireless device (or UE) can include processor electronics 320 such as a microprocessor that implements one or more of the techniques presented in this document. The apparatus 310 can include transceiver electronics 330 to send and/or receive wireless signals over one or more communication interfaces such as antenna 340. The apparatus 310 can include other communication interfaces for transmitting and receiving data. The apparatus 310 can include one or more memories (not explicitly shown) configured to store information such as data and/or instructions. In some implementations, the processor electronics 320 can include at least a portion of transceiver electronics 330. In some embodiments, at least some of the disclosed techniques, modules or functions are implemented using the apparatus 310.

Figure 4:
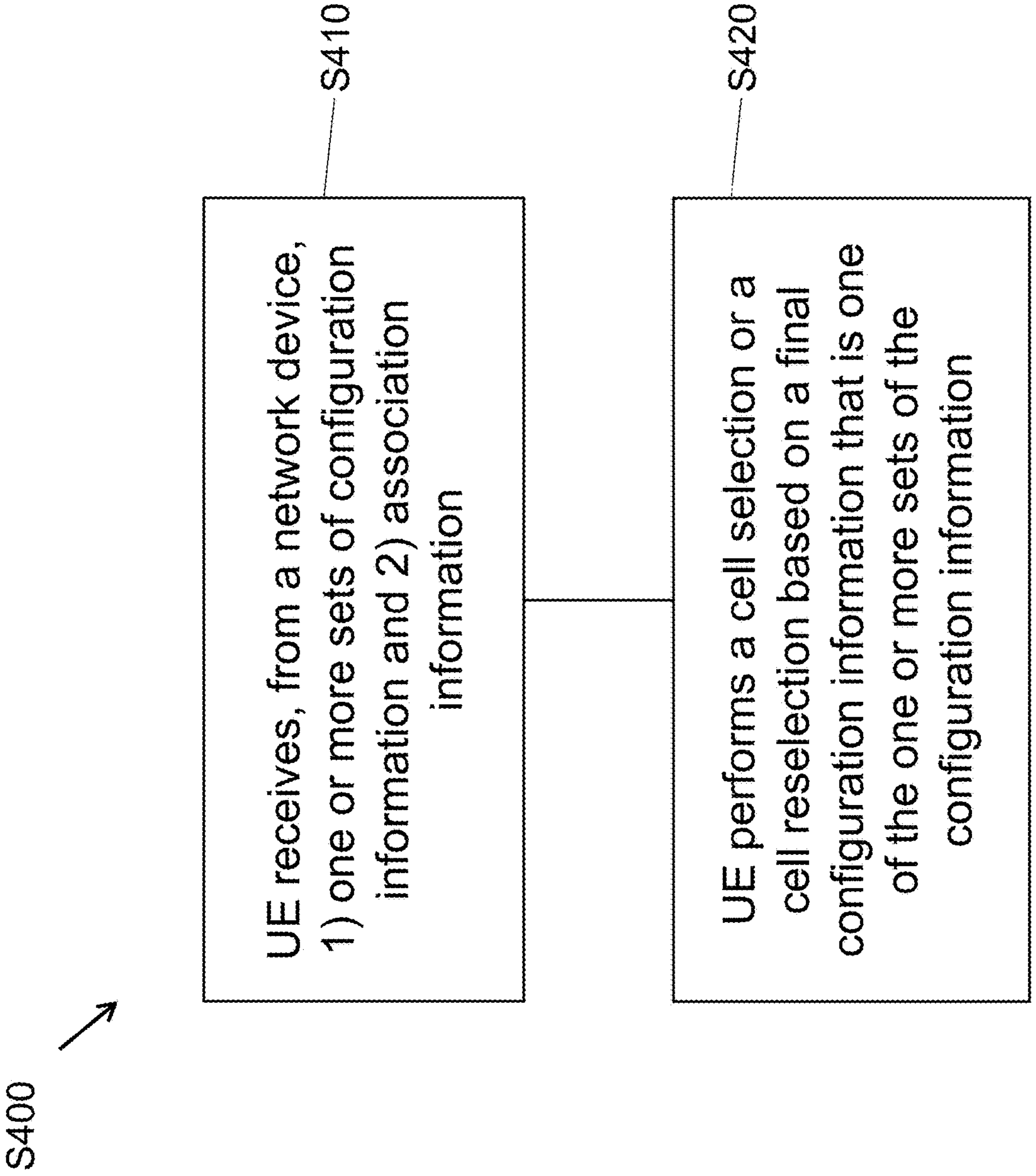
FIG. 4 shows an example of a flowchart showing operations of a UE based on some implementations of the disclosed technology

FIG. 4 shows an example of a flowchart showing operations of a UE based on some implementations of the disclosed technology. At operation 410, the UE receives, from a network device, 1) one or more sets of configuration information (e.g., information used to select or reselect a cell) and 2) the association information indicating associations between network slices or network slice groups and the multiple sets of the configuration information. For example, the one or more sets of configuration information is for a cell selection or a cell reselection and each of the multiple sets of the configuration information is associated with a corresponding network slice or a corresponding network slice group. At operation 420, the UE performs a cell selection or a cell reselection based on a final configuration information that is one of the multiple sets of the configuration information. Thus, the UE can apply the final configuration information for an intended slice when performing the cell selection or reselection. In some implementations, the final configuration information is selected among the one or more sets of the configuration information by the UE. In some implementations, the final configuration information is a default configuration information or a configuration information set associated with a default network slice or default network slice group. The default configuration information set, the default network slice or the default network slice group are defined in specification or configured by the network device and received by the user device via a SIB1 message, a system information message, a dedicated RRC (radio resource control) message, or a NAS (non-access stratum) signaling.

In some implementations, the one or more sets of configuration information includes cell reselection priorities and each reselection priority is related to at least one of a frequency or a cell. In some implementations, at least one of the one or more sets of the configuration information includes an identification (ID) of a network slice or a network slice group that is supported by the network device.

In some implementations, the association information is received with a configuration information index identifying a corresponding set of the configuration information and the associated one or more Single Network Slice Selection Assistance Information (S-NSSAIs) identifying one or more network slices or network slice groups. In some implementation examples, the association information is received with a slice index identifying a corresponding network slice or network slice group and the associated one or more sets of configuration information for cell selection and reselection. In some implementation examples, the association information is received with a list of network slice or network slice group supported by the network device and each network slice or network slice group in the list is assigned with an identification.

In some implementations, the one or more sets of the configuration information is included in a first radio resource control (RRC) message or a first NAS (non-access sartum) message and the association information is included in a second RRC message or a second NAS message. In some implementations, the first RRC message and the second RRC message is a system information block 1 (SIB1) message or a system information message or a dedicated RRC message. In some implementation the one or more sets of the configuration and the association information is included in the same RRC message (SIB1, system information message or dedicated RRC message) or the same NAS message.

In some implementations, the operation 410 is performed such that the one or multiple sets of configuration information can be provided via system information (e.g. SIB1/SIB2/SIB4) or dedicated RRC signaling (e.g. RRCRelease message). The association information between slices or slice groups and the one or more sets of the configuration information can be configured via system information or dedicated RRC signaling (e.g. RRCRelease message) or NAS (non-access-stratum) signaling in the following different ways:

Implementation 1: The NW configures one or multiple sets of configuration information and each set of the configuration information is assigned with a configuration information index. For each network slice (identified by a S-NSSAI) or network slice group (identified by a network slice group identifier), the configuration information index is configured to link the network slice or network slice group to the configuration information (e.g. cell reselection priorities) identified by the index.

Implementation 2: The NW provides a list of network slices or network slice groups that are supported within a tracking area or registration area via NAS signaling (e.g. Registration Accept message or Configuration Update Command message). The first slice or slice group in the list is assigned with network slice index 0 or slice group index 0, the second network slice or network slice group in the list is assigned with slice index 1 or slice group index 1, and so on. For each network slice or network slice group index, a set of configuration information (e.g. a set of cell reselection priorities) is configured from the NW to the UE via system information message or dedicated RRC signaling (e.g. RRCRelease message).

Implementation 3: The NW provides a list of network slices or network slice groups that are supported within a tracking area or registration area via NAS signaling (e.g. Registration Accept message or Configuration Update Command message). Each network slice or network slice group in the list is assigned with an identification (ID). For each network slice or network slice group supported by a cell or a frequency, the identification is configured by the gNB and transmitted to the UE via system information or dedicated RRC signaling (e.g. RRCRelease message). The supported network slice identification list or network slice group identification list can be configured per frequency, per cell or per PLMN. UE will receive the list of the supported network slices or network slice groups and only consider cells who support UE's intended slice(s) as a suitable cell.

The one or more sets of configuration information and the association information between the network slice/network slice group can be provided in the same RRC message (e.g. SIB1 message, system information message or RRCRelease message) or different messages. For example, the one or more sets of configuration information are broadcasted in system information while the association information between network slices/network slice groups and the one or more sets of the configuration information is configured via dedicated RRC signaling (e.g. RRCRelease message) or NAS signaling.

In some implementations, an indicator may be configured to indicate that whether the UE is allowed to apply the configuration information associated with the slice or slice group via system information or dedicated RRC signaling or NAS signaling. In this case, the UE starts to apply the configuration information associated with the intended network slice, when the indicator (if configured) shows that the UE is allowed to apply the corresponding configuration information.

In some implementations, a timer may be configured to show the validity time of the association information between the network slices or network slice groups and the one or more sets of the configuration information via system information or dedicated RRC signaling.

For the case when the UE supports more than one slice and is provided with associated configuration information for each supported slice, the following handling can be considered:

Implementation 1: The NW configures one default network slice/slice group or a default set of configuration information via system information or dedicated RRC signaling. When the UE supports more than one network slices with associated configuration information, the UE may apply the default set of configuration information or the configuration information associated with the default network slice/network slice group.

Implementation 2: The UE selects one from the supported network slices or network slice groups and apply the associated configuration information.

Implementation 3: A default network slice/network slice group or a default set of configuration information set (e.g. the first slice/slice group or the first set of configuration information configured via system information or dedicated RRC signaling) is defined according to a relevant specification. The UE will apply the default set of configuration information or the configuration information associated with the default network slice/network slice group.

Figure 5:
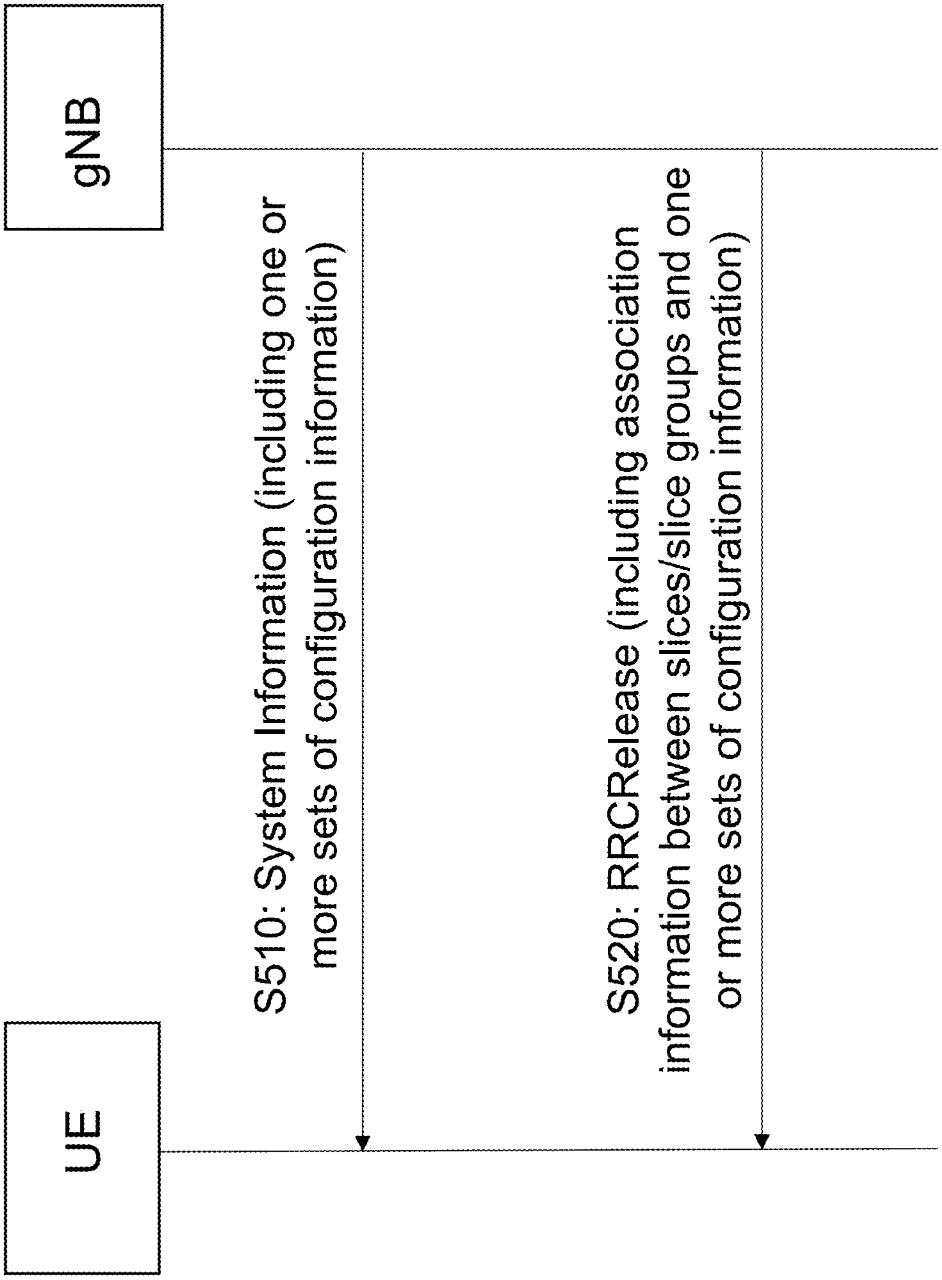
FIG. 5 shows an example of a flowchart showing operations between a UE and a gNB based on some implementations of the disclosed technology.

FIG. 5 shows an example of a flowchart showing operations between a UE and a NW based on some implementations of the disclosed technology. The network device may correspond to a gNB node. The example as shown in FIG. 5 illustrates that the UE receives, at step 510, system information (e.g. SIB2 or SIB4) including one or more alternative cell reselection priority sets in addition to the existing reselection priority. The cell reselection priority sets are communicated as an example of the configuration information sets. Then, at step 520, the UE receives RRCRelease message including the association information between network slices/network slice groups and the reselection information sets. In some implementations, the RRCRelease message may include reselection information index (corresponding to the configuration information index as described above) and further include an indicator indicating that UE is allowed to apply the reselection information associated with the slice and a validity timer for the association. UE can start to apply the reselection priority set associated with the intended slice if the indicator is set to "true".

An example of the alternative cell reselection priority sets broadcasting in SIB2 is given below. The parts related to the broadcasting of the cell reselection priority sets are shown in bold and Italic.

```
-- ASN1START
-- TAG-SI32-START
SIB2 : :=                          SEQUENCE {
Partly omitted
    [ [
altCellReselectionPrioritySetList-r17      SEQUENCE (SIZE (1. . maxReselectionPriorities) )
OF AltCellReselectionPrioritySet-r17
    ] ]
}
AltCellReselectionPriority-r17 : := SEQUENCE {
   altCellReselectionPriority-
r17        CellReselectionPriority             OPTIONAL, -- Need R
   altCellReselectionSubPriority-r17      CellReselectionSubPriority-
r13        OPTIONAL     -- Need R
}
-- TAG-SI32-STOP
-- ASN1STOP
```

An example of the alternative cell reselection priority sets broadcasting in SIB4 is given below. The parts related to the broadcasting of the cell reselection priority sets are shown in bold and Italic.

```
-- ASN1START
-- TAG-SI34-START
SIB4 : :=                          SEQUENCE {
   interFreqCarrierFreqList           ,
   lateNonCriticalExtension             OCTET STRING                        OPTIONAL,
   . . . ,
   interFreqCarrierFreqList-v16xy }           OPTIONAL     -- Need R
}
InterFreqCarrierFreqList : :=        SEQUENCE (SIZE (1 . . maxFreq) ) OF InterFreqCarrierFreqInfo
InterFreqCarrierFreqList-v16xy : : =   SEQUENCE ( SIZE (1 . . maxFreq) ) OF InterFreqCarrierFreqInfo-
v16xy
InterFreqCarrierFreqList-v17xy ::=   SEQUENCE (SIZE (1 . . maxFreq) ) OF InterFreqCarrierFreqInfo-
v17xy
Partly omitted
InterFreqCarrierFreqInfo-v17xy : := SEQUENCE {
altCellReselectionPrioritySetList-r17            SEQUENCE (SIZE (1 . . maxReselectionPriorities) )
OF AltCellReselectionPrioritySet-r17
}
AltCellReselectionPriority-r17 : :=     SEQUENCE {
   altCellReselectionPriority-r17                  CellReselectionPriority
OPTIONAL,    -- Need R
   altCellReselectionSubPriority-r17               CellReselectionSubPriority-r13
OPTIONAL    -- Need R
}
-- TAG-SI34-STOP
-- ASN1STOP
```

The below shows examples showing the association information between slices/slice groups and reselection priority sets, an indicator showing the applicability of the slice associated reselection priority set, and the validity timer.

```
-- ASN1START
-- TAG-RRCRELEASE-START
RRCRelease : :=                    SEQUENCE {
   rrc-TransactionIdentifier          RRC-TransactionIdentifier,
   criticalExtensions                 CHOICE {
      rrcRelease                         RRCRelease-IEs,
      criticalExtensions Future          SEQUENCE { }
   }
}
RRCRelease-IEs : :=                SEQUENCE {
   redirectedCarrierInfo              RedirectedCarrierInfo
OPTIONAL, -- Need N
   cellReselectionPriorities          CellReselectionPriorities
OPTIONAL, -- Need R
   suspendConfig                      SuspendConfig
OPTIONAL, -- Need R
   deprioritisationReq                SEQUENCE {
      deprioritisationType               ENUMERATED { frequency, nr},
```

-continued

```
    deprioritisationTimer            ENUMERATED {min5, min10, min15, min30}
  }
OPTIONAL,       -- Need N
  lateNonCriticalExtension           OCTET STRING
OPTIONAL,
  nonCriticalExtension               RRCRelease-v1540-IEs
OPTIONAL
}
RRCRelease-v1540-IEs ::=          SEQUENCE {
  waitTime                          RejectWaitTime                 OPTIONAL,    -- Need N
  nonCriticalExtension              RRCRelease-v16xy-IEs OPTIONAL
}
RRCRelease-v16xy-IEs : : =        SEQUENCE {
  voiceFallbackIndication-r16       ENUMERATED { true }                          OPTIONAL,
-- Need N
  measIdleConfig-r16                SetupRelease {MeasIdleConfigDedicated-r16}    OPTIONAL,
-- Need M
  nonCriticalExtension            SEQUENCE { }                                  OPTIONAL
}
Partly omitted
RRCRelease-v17xy-IEs : :=         SEQUENCE {
      sliceAssociatedReselectionPriorityList-r17 SEQUENCE (SIZE (1 . . maxNrofS-NSSAI)) OF
SliceAssociatedReselectionPriority-v17xy
      useSliceAssociatedReselectionPriority-r17 ENUMERATED {true}
OPTIONAL,   -- Need N
      t3xx-r17                              ENUMERATED  {min5, min10, min20, min30,
min60, min120, min180, spare1}       OPTIONAL,    -- Need R
    nonCriticalExtension                 SEQUENCE { }
OPTIONAL
}
SliceAssociatedReselectionPriority-v17xy : : =SEQUENCE{
  S-NSSAI-r17                          S-NSSAI OPTIONAL,    -- Need N
  reselectionPrioritySetIndex          INTEGER (0 . . maxReselectionPriorities-
1)     OPTIONAL     -- Need N
}
-- TAG-RRCRELEASE-STOP
-- ASN1STOP
```

Figure 6:
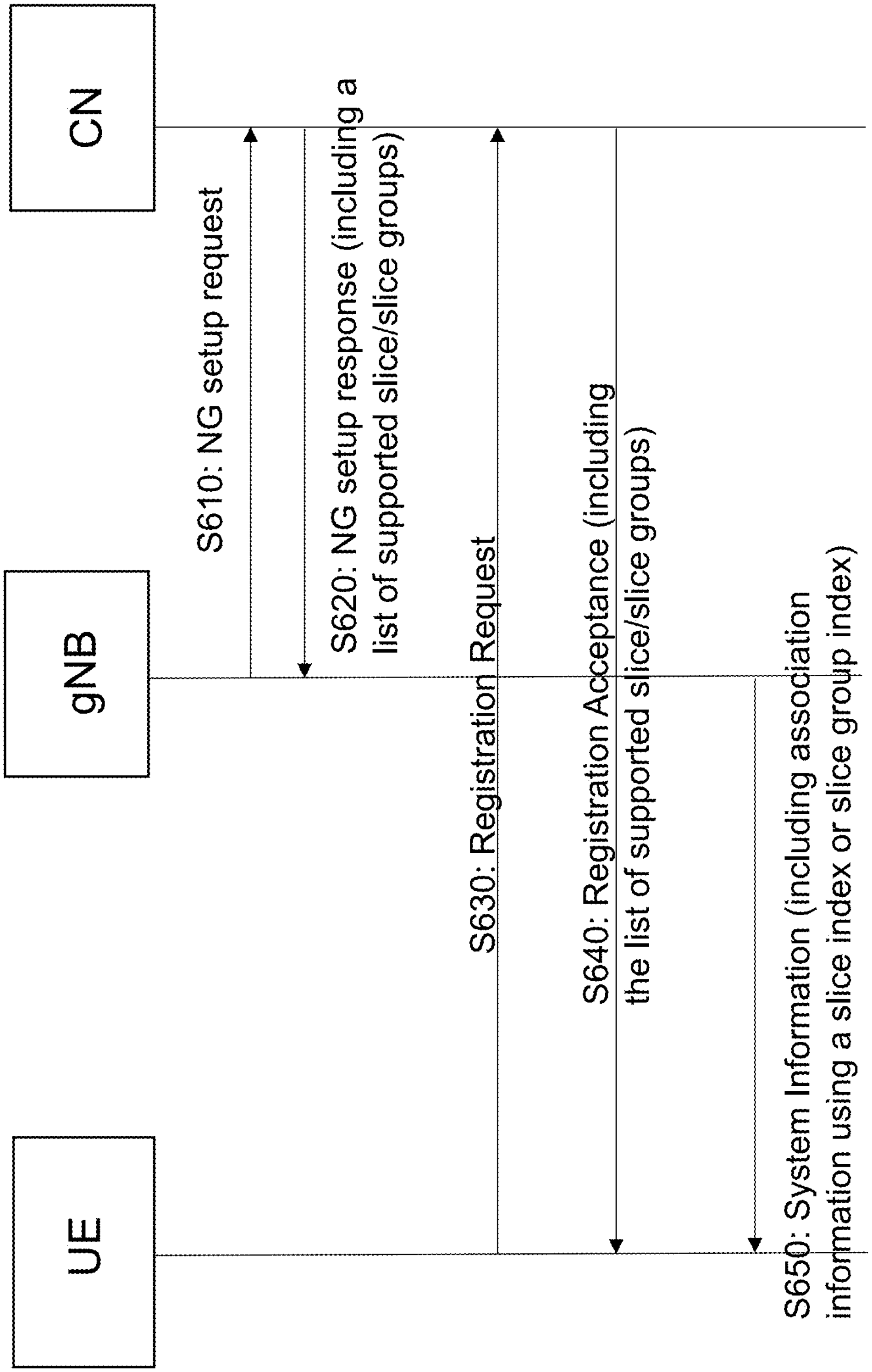
FIG. 6 shows an example of a flowchart showing operations between a UE, a gNB, and a core network based on some implementations of the disclosed technology.

FIG. 6 shows an example of a flowchart showing operations between a UE, a gNB node, and a core network, CN based on some implementations of the disclosed technology. At step 610, the gNB node sends the NG setup request to the CN to exchange data needed for a future communication. At step 620, the gNB node receives the NG response including a list of network slices or network slice groups that are supported by the core network. At step 630, the UE sends the registration request (e.g. with the registration type "initial registration") to CN. At step 640, the CN sends to the UE the registration acceptance message including the list of supported network slices/network slice groups within the registration area. Considering that a registration area may cover more than one tracking area, the supported network slices/network slice groups within the registration area can be provided per tracking area or per registration area. Each network slice or network slice group in the list is assigned with a slice index or slice group index following the order of the network slices or network slice groups in the list. For example, the first network slice in the list is assigned with slice index 0, the second network slice in the list is assigned with slice index 1, and so on. At step 650, the UE receives system information (e.g. SIB2 or SIB4) in which reselection information (e.g. cell reselection priorities per cell or per frequency) is configured for each network slice index.

An example of the alternative cell reselection priority sets broadcasting in SIB2 is given below. The parts related to the broadcasting of the cell reselection priority sets are shown in bold and Italic.

```
---- ASN1START
-- TAG-SI32-START
SIB2 : :=                     SEQUENCE {
Partly omitted
   [ [
cellReselectionPriorityPerSliceList-r17      SEQUENCE (SIZE (1 . . maxNrofS-NSSAI)) OF
CellReselectionPriorityPerSlice-r17
   [ [
}
CellReselectionPriorityPerSlice-r17 : := SEQUENCE {
   slice index                    INTEGER (0 . . maxNrofS-NSSAI-1)    OPTIONAL,   -- Need N
   altCellReselectionPriority-
r17        CellReselectionPriority               OPTIONAL,    -- Need R
  altCellReselectionSubPriority-r17          CellReselectionSubPriority-
r13          OPTIONAL    -- Need R
}
-- TAG-SI32-STOP
-- ASN1STOP
```

An example of the alternative cell reselection priority sets broadcasting in SIB4 is given below. The parts related to the broadcasting of the cell reselection priority sets are shown in bold and Italic.

```
-- ASN1START
-- TAG-SI34-START
SIB4 : :=                              SEQUENCE {
   interFreqCarrierFreqList              InterFreqCarrierFreqList,
   lateNonCriticalExtension              OCTET STRING                      OPTIONAL,
   . . . ,
   interFreqCarrierFreqList-v16xy        InterFreqCarrierFreqList-v16xy     OPTIONAL
-- Need R
}
InterFreqCarrierFreqList : :=          SEQUENCE (SIZE (1. . maxFreq) ) OF InterFreqCarrierFreqInfo
InterFreqCarrierFreqList-v16xy : :=    SEQUENCE (SIZE (1. . maxFreq) ) OF InterFreqCarrierFreqInfo-
v16xy
InterFreqCarrierFreqList-v17xy : :=    SEQUENCE (SIZE (1. . maxFreq) ) OF InterFreqCarrierFreqInfo-
v17xy
Partly omitted
InterFreqCarrierFreqInfo-v17xy : :=    SEQUENCE {
cellReselectionPriorityPerSliceList-r17          SEQUENCE (SIZE (1. . maxNrofS-NSSAI)) OF
CellReselectionPriorityPerSlice-r17
}
CellReselectionPriorityPerSlice-r17 : := SEQUENCE {
   slice index                         INTEGER (0 . . maxNrofS-NSSAI-1) OPTIONAL,   -- Need N
   altCellReselectionPriority-r17                CellReselectionPriority
OPTIONAL,    -- Need R
   altCellReselectionSubPriority-r17             CellReselectionSubPriority-r13
OPTIONAL     -- Need R
}
-- TAG-SI34-STOP
-- ASN1STOP
```

Figure 7:
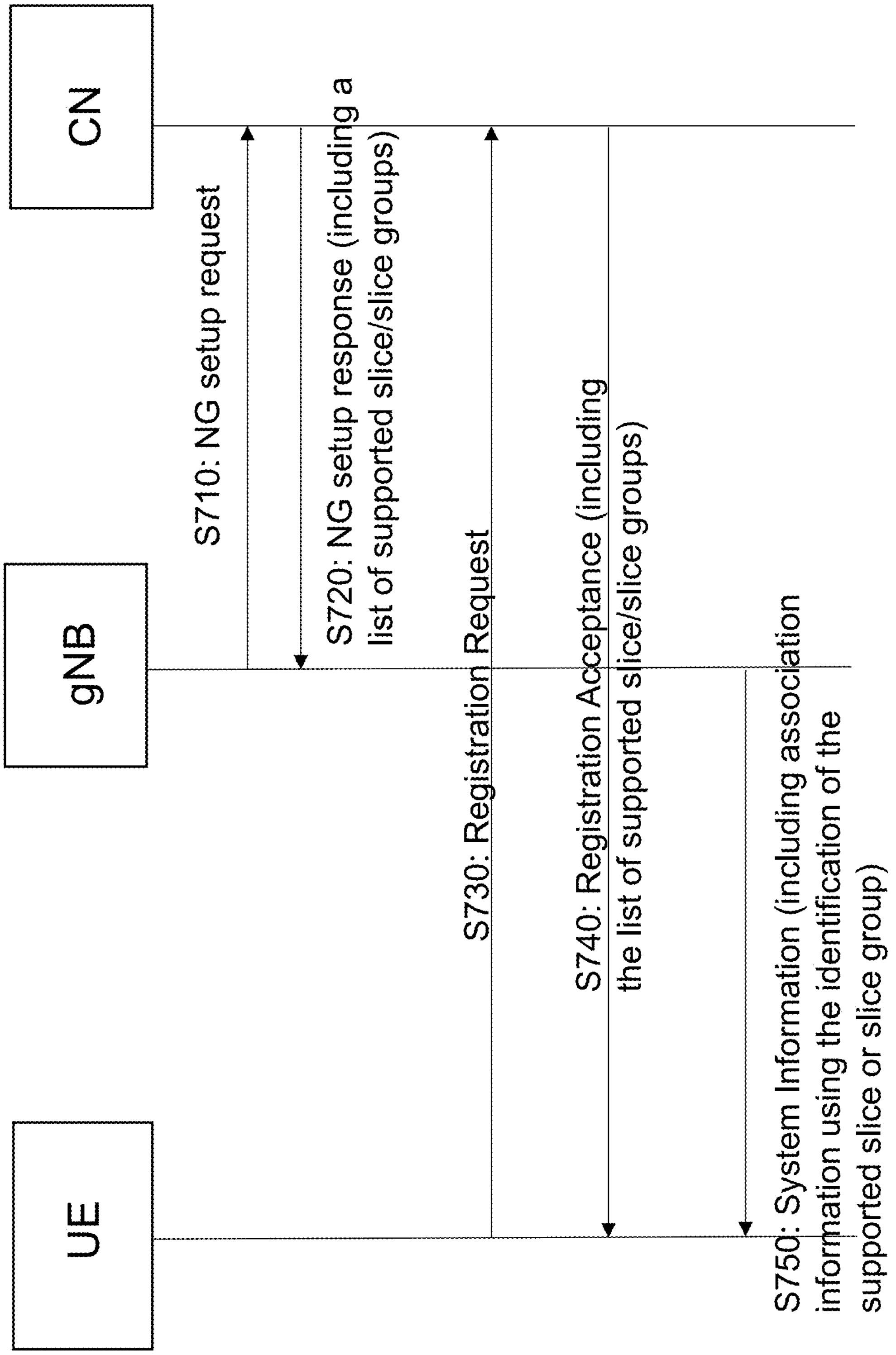
FIG. 7 shows an example of a flowchart showing operations between a UE, a gNB node, and a core network based on some implementations of the disclosed technology.

FIG. 7 shows an example of a flowchart showing operations between a UE, a gNB node, and a core network, CN based on some implementations of the disclosed technology. At step 710, the gNB node sends the NG setup request to the CN to exchange data needed for a future communication. At step 720, the gNB node receives the NG response including a list of network slices or network slice groups that are supported by the core network. At step 730, the UE sends the registration request (e.g. with the registration type "initial registration") to CN. At step 740, the CN sends to the UE the registration acceptance message including the list of supported network slices/network slice groups within the registration area. Each network slice or network slice group in the list is assigned with a slice identification or slice group identification. Considering that a registration area may cover more than one tracking area, the supported network slices/network slice groups within the registration area can be provided per tracking area or per registration area. The supported network slices/network slice groups within the registration area may also be provided per PLMN. At step 750, the UE receives system information (e.g. SIB1) in which the identifications of the supported network slice or network slice group by a cell or a frequency is configured. The supported network slice or network slice group identification for a cell or a frequency may also be configured per PLMN. UE will then take the supported network slice or network slice group of a cell or frequency into consideration and only consider cells who support UE's intended slice(s) as a suitable cell.

Figure 8:
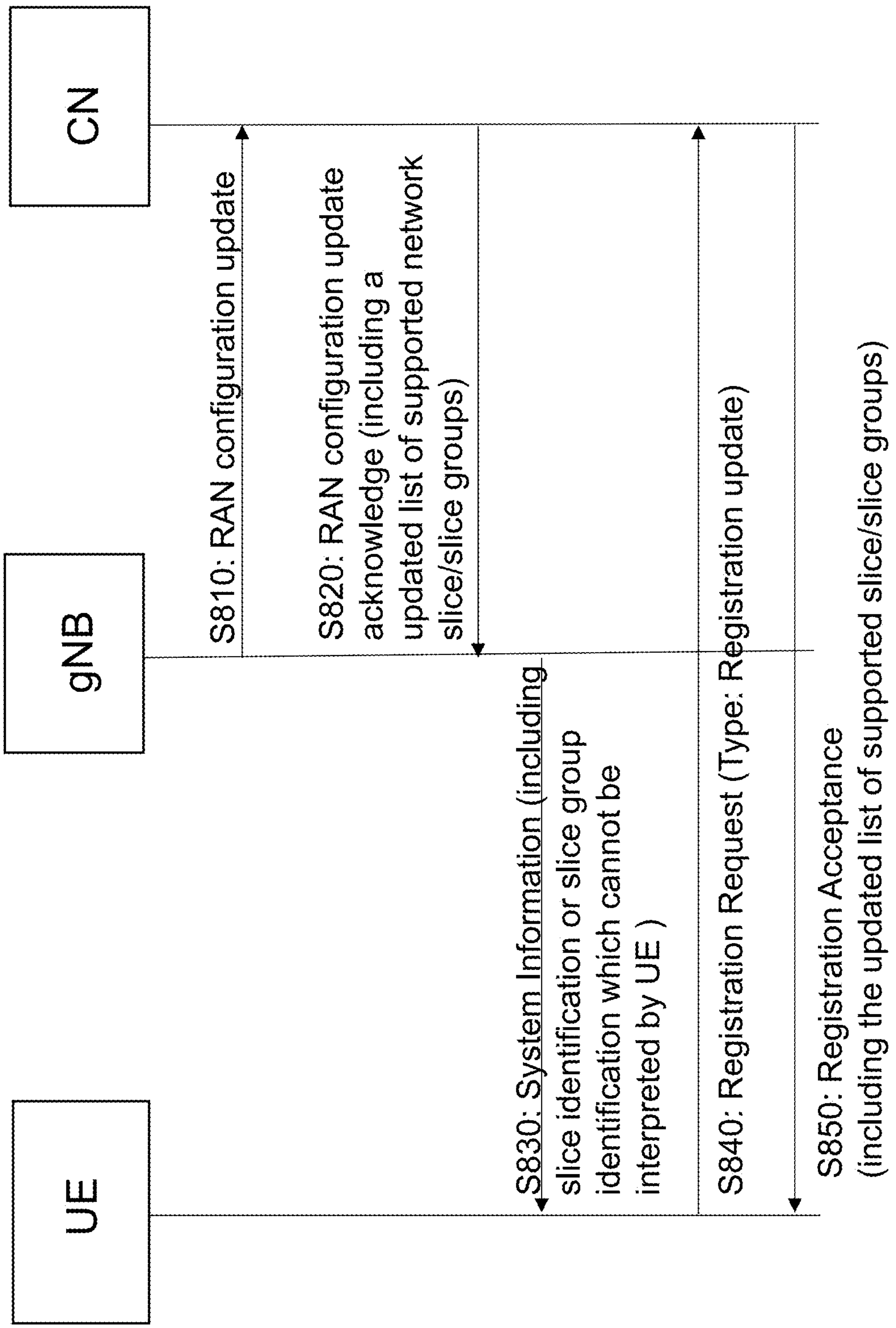
FIG. 8 shows an example of a flowchart showing operations between a UE, a gNB node, and a core network based on some implementations of the disclosed technology.

FIG. 8 shows an example of a flowchart showing operations between a UE, a gNB node, and a core network, CN based on some implementations of the disclosed technology. At step 810, the gNB node sends the RAN configuration update message to the CN to update the supported network slice list or the network slice group list (e.g. to add one or more new network slices or slice groups into the list). At step 820, the gNB node receives the RAN configuration update acknowledge message including a updated list of network slices or network slice groups that are supported by both the RAN node and the core network. At step 830, the gNB broadcast the supported network slice identifications or network slice group identifications to UE. At step 840, if there is any network slice identifications or network slice group identifications UE cannot interpret, UE will transmit registration request message to CN with the registration type registration update, in which the broadcast network slice identification or slice group identification is also included. At step 850, the CN will send back a registration accept message including an updated list of supported network slice or slice groups and the associated identifications. UE can then be able to interpret the network slice identification or the slice group identification into a certain network slice or slice group and take the supported network slice or network slice group of a cell or frequency into consideration and only consider cells who support UE's intended slice(s) as a suitable cell.

Figure 9:
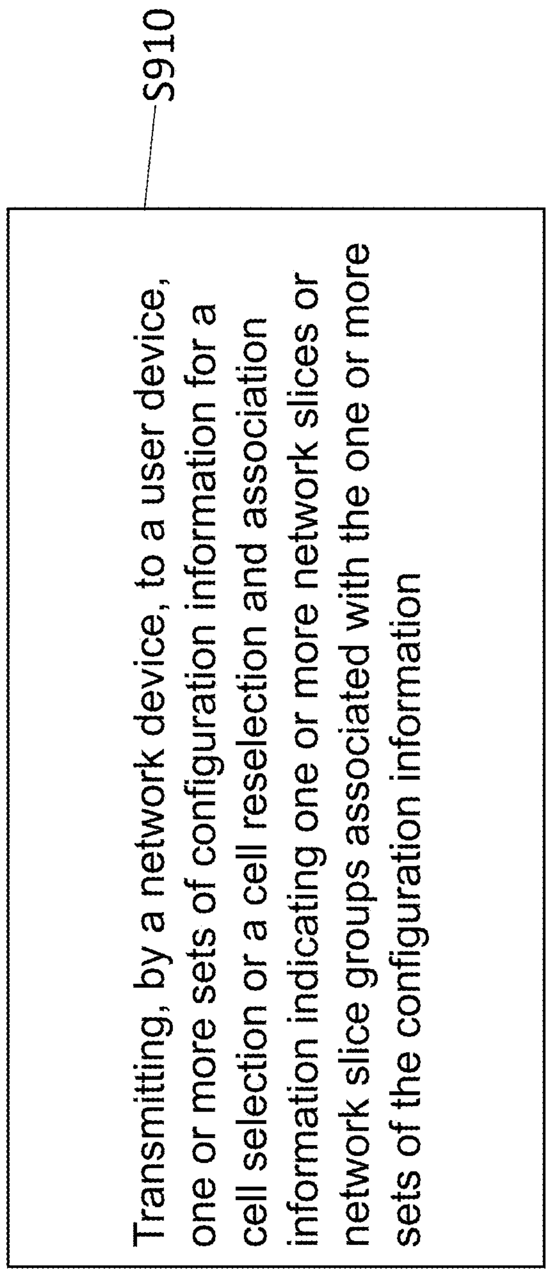
FIG. 9 shows an example of a flowchart showing operations of a network based on some implementations of the disclosed technology.

FIG. 9 shows an example of a flowchart showing operations of a network device based on some implementations of the disclosed technology. At 910, the network device transmits, to a user device, one or more sets of configuration information for a cell selection or a cell reselection and association information indicating one or more network slices or network slice groups associated with the one or more sets of the configuration information Additional features of the above-described methods/techniques that may be preferably implemented in some implementations are described below using a clause-based description format.

1. A wireless communication method, comprising: receiving, by a user device, from a network device, one or more sets of configuration information for a cell selection or a cell reselection and association information indicating one or more network slices or network slice groups associated with the one or more sets of the configuration information; and performing, by the user device, the cell selection or the cell reselection based on a final configuration information that is one of the one or more sets of the configuration information.

As described in the present document, the network device may be a base station. In some embodiments, the user device may be a mobile phone, a tablet or another computing device having wireless communication capability.

2. The method of clause 1, further comprising: selecting, by the user device, the final configuration information among the one or more sets of the configuration information.
3. The method of clause 2, wherein the final configuration information is selected based on an implementation of the user device.
4. The method of clause 2, wherein the final configuration information is a default configuration information or a configuration information set associated with a default network slice or default network slice group.
5. The method of clause 4, wherein the default configuration information set, the default network slice or default network slice group is defined in a specification or configured by the network device and received by the user device via a SIB1 message, a system information message, a dedicated RRC (radio resource control) message, or a NAS (non-access stratum) signaling.
6. The method of clause 1, wherein the one or more sets of configuration information includes cell reselection priorities, each reselection priority related to at least one of a frequency or a cell.
7. The method of clause 1, wherein at least one of the one or more sets of the configuration information includes an identification (ID) of a network slice or a network slice group that is supported by the network device.
8. The method of clause 1, wherein the one or more sets of the configuration information are included in a first radio resource control (RRC) message or a first NAS (non-access startum) message and the association information is included in a second RRC message or a second NAS message.
9. The method of clause 8, wherein the first RRC message and the second RRC message is a system information message or a dedicated RRC message.
10. The method of clause 1, wherein the one or more sets of the configuration and the association information are included in a same RRC message, a same system information message, or a same NAS message.
11. The method of clause 1, further comprising: receiving, by the user device, an indication whether the one or more sets of the configuration information are available for use in the user device.
12. The method of clause 1, wherein the association information further indicates time information how long associations between the one or more network slices or network slice groups and the one or more sets of configuration information are to be valid.
13. The method of clause 1, wherein the association information is received with a configuration information index identifying a corresponding set of the configuration information and one or more S-NSSAI (Single Network Slice Selection Assistance Information) identifying one or more network slices or network slice groups.
14. The method of clause 1, wherein the association information is received with a slice index identifying a corresponding network slice or network slice group and the one or more sets of configuration information for the cell selection and the cell reselection.
15. The method of clause 1, wherein the association information is received with a list of network slice or network slice group supported by the network device and each network slice or network slice group in the list is assigned with an identification.
16. A wireless communication method, comprising: transmitting, by a network device, to a user device, one or more sets of configuration information for a cell selection or a cell reselection and association information indicating one or more network slices or network slice groups associated with the one or more sets of the configuration information.
17. The method of clause 16, further comprising, prior to the transmitting of the one or more sets of the configuration information: transmitting, by the network device, to a core network device, a resource set up request to set up resources for a communication; receiving, from the core network device, a resource setup response including a list of network slices or network slice groups that are supported by the core network device.
18. The method of clause 16, wherein the association information includes an updated list of network slices or network slice groups are received from the core network device in response to an update request from the network device to the core network device.
19. The method of clause 16, wherein the one or more sets of configuration information includes a default configuration information or configuration information set associated with a default network slice or default network slice group.
20. The method of clause 19, wherein the default configuration information set, the default network slice or default network slice group is defined in a specification or configured by the network and transmitted to the user device via a SIB1 message, a system information message, a dedicated RRC (radio resource control) message, or a NAS (non-access stratum) signaling.
21. The method of clause 19, wherein the one or more sets of configuration includes cell reselection priorities, each reselection priority related to at least one of a frequency or a cell.
22. The method of clause 19, wherein at least one of the one or more sets of the configuration information includes an identification (ID) of a network slice or a network slice group that is supported by the network device.
23. The method of clause 19, wherein the one or more sets of the configuration information are included in a first radio resource control (RRC) message or a first NAS (non-access startum) message and the association information is included in a second RRC message or a second NAS message.
24. The method of clause 23, wherein each of the first RRC message and the second RRC message is a system information message or a dedicated RRC message.
25. The method of clause 23, wherein the one or more sets of the configuration and the association information are included in a same RRC message, a same system information message, or a same NAS message.
26. The method of clause 23, wherein the association information further indicates time information how long associations between the one or more network slices or network slice groups and the one or more sets of configuration information are to be valid.

27. The method of clause 23, wherein the association information is received with a configuration information index identifying a corresponding set of the configuration information and one or more S-NSSAI (Single Network Slice Selection Assistance Information) identifying one or more network slices or network slice groups.
28. The method of clause 23, wherein the association information is received with a slice index identifying a corresponding network slice or network slice group and the one or more sets of configuration information for the cell selection and the cell reselection.
29. The method of clause 23, wherein the association information is received with a list of network slice or network slice group supported by the network device and each network slice or network slice group in the list is assigned with an identification.
30. The method of clause 23, further comprising: transmitting, by the network device, an indication whether the one or more sets of the configuration information are available for use in the user device.
31. A communication apparatus comprising a processor configured to implement a method recited in any one or more of clauses 1 to 30.
32. A computer readable medium on which processor-executable code for implementing a method described in any one or more of clauses 1 to 30.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a user device, from a network device, one or more sets of configuration information for a cell selection or a cell reselection, wherein at least one of the one or more sets of configuration information includes cell reselection priorities;

receiving, by the user device, association information indicating one or more network slice groups that are associated with the one or more sets of configuration information, wherein the association information includes a list of network slice groups that are supported by the network device, each network slice group in the list being assigned with a corresponding identification;

selecting, by the user device, a final configuration information among the one or more sets of configuration information; and performing, by the user device, the cell selection or the cell reselection based on the final configuration information.

2. The wireless communication method of claim 1, wherein the final configuration information is selected based on an implementation of the user device, or wherein the final configuration information is a default configuration information or a configuration information set associated with a default network slice group, or wherein the default configuration information, the default network slice group are defined in a specification or configured by the network device and received by the user device via a SIB1 (system information block 1) message, a system information message, a dedicated RRC (radio resource control) message, or a NAS (non-access stratum) message.

3. The wireless communication method of claim 1, wherein the one or more sets of configuration information are included in a first radio resource control (RRC) message or a first NAS (non-access stratum) message and the association information is included in a second RRC message or a second NAS message, the first RRC message and the second RRC message being a system information message or a dedicated RRC message, or wherein the one or more sets of configuration information and the association information are included in a same RRC message, a same system information message, or a same NAS message.

4. The wireless communication method of claim 3, wherein the association information further indicates time information how long associations between the one or more network slice groups and the one or more sets of configuration information are to be valid.

5. The wireless communication method of claim 3, wherein the association information further includes at least one of i) a configuration information index identifying a corresponding set of configuration information and one or more S-NSSAI (Single Network Slice Selection Assistance Information) identifying one or more network slice groups, or ii) a slice index identifying a corresponding network slice group and the one or more sets of configuration information for the cell selection and the cell reselection.

6. The wireless communication method of claim 3, further comprising:

transmitting, by the network device, an indication whether the one or more sets of configuration information are available for use in the user device.

7. The wireless communication method of claim 1, further comprising:

receiving, by the user device, an indication whether the one or more sets of configuration information are available for use in the user device.

8. The wireless communication method of claim 1, wherein the association information further indicates time information how long associations between the one or more network slice groups and the one or more sets of configuration information are to be valid.

9. The wireless communication method of claim 1, wherein the association information further includes at least one of i) a configuration information index identifying a corresponding set of configuration information and one or more S-NSSAI (Single Network Slice Selection Assistance Information) identifying one or more network slice groups, or ii) a slice index identifying a corresponding network slice group and the one or more sets of configuration information for the cell selection and the cell reselection.

10. A wireless communication method, comprising:

transmitting, by a network device, to a core network device, a resource set up request to set up resources for a communication;

receiving, from the core network device, a resource setup response including a list of network slice groups that are supported by the core network device; and transmitting, by the network device, to a user device, one or more sets of configuration information for a cell selection or a cell reselection, wherein at least one of the one or more sets of configuration information includes cell reselection priorities;

transmitting, by the network device, to the user device, association information indicating one or more network slice groups that are associated with the one or more sets of configuration information, wherein the association information includes a list of network slice groups that are supported by the network device, each network slice group in the list being assigned with a corresponding identification.

11. The wireless communication method of claim 10, further comprising: receiving, from the core network device, an updated list of network slice groups in response to an update request from the network device to the core network device.

12. The wireless communication method of claim 10, wherein the one or more sets of configuration information includes a default configuration information or configuration information set associated with a default network slice group, and wherein the default configuration information, the default network slice group is defined in a specification or configured by the network device and transmitted to the user device via a SIB1 (system information block 1) message, a system information message, a dedicated RRC (radio resource control) message, or a NAS (non-access stratum) message.

13. The wireless communication method of claim 10, wherein the one or more sets of configuration information are included in a first radio resource control (RRC) message or a first NAS (non-access stratum) message and the association information is included in a second RRC message or a second NAS message, each of the first RRC message and the second RRC message being a system information message or a dedicated RRC message, or wherein the one or more sets of configuration information and the association information are included in a same RRC message, a same system information message, or a same NAS message.

14. A communication apparatus comprising at least one processor configured to implement a method comprising:

receiving, by a user device, from a network device, one or more sets of configuration information for a cell selection or a cell reselection, wherein at least one of the one or more sets of configuration information includes cell reselection priorities;

receiving, by the user device, association information indicating one or network slice groups that are associated with the one or more sets of configuration information, wherein the association information includes a list of network slice groups that are supported by the network device, each network slice group in the list being assigned with a corresponding identification;

selecting, by the user device, a final configuration information among the one or more sets of configuration information; and performing, by the user device, the cell selection or the cell reselection based on the final configuration information.

15. The communication apparatus of claim 14, wherein the final configuration information is selected based on an implementation of the user device, or wherein the final configuration information is a default configuration information or a configuration information set associated with default network slice group.

16. The communication apparatus of claim 14, wherein the association information further indicates time information how long associations between the one or more network slice groups and the one or more sets of configuration information are to be valid.

17. The communication apparatus of claim 14, wherein the association information further includes at least one of i) a configuration information index identifying a corresponding set of configuration information and one or more S-NSSAI (Single Network Slice Selection Assistance Information) identifying one or more network slice groups, or ii) a slice index identifying a corresponding network slice group and the one or more sets of configuration information for the cell selection and the cell reselection.

* * * * *